United States Patent [19]
Stuart et al.

[11] Patent Number: 4,772,399
[45] Date of Patent: * Sep. 20, 1988

[54] RECOVERY OF SUCCINIMIDES FROM FILTER CAKES

[75] Inventors: Frank A. Stuart, San Rafael; William H. Tyson, Jr., Moraga, both of Calif.

[73] Assignee: Claypro USA, Walnut Creek, Calif.

[*] Notice: The portion of the term of this patent subsequent to Feb. 26, 2002 has been disclaimed.

[21] Appl. No.: 681,840

[22] Filed: Dec. 14, 1984

Related U.S. Application Data

[63] Continuation-in-part of Ser. No. 505,905, Jun. 20, 1983, Pat. No. 4,501,670, which is a continuation-in-part of Ser. No. 335,261, Dec. 23, 1981, abandoned.

[51] Int. Cl.$^4$ ............ B01D 37/00; B01D 12/00; C02F 1/00
[52] U.S. Cl. ............ 210/769; 210/770; 210/772
[58] Field of Search ............ 210/769, 770, 771, 772, 210/776; 208/8 LE; 134/2, 25.1, 40

[56] References Cited

U.S. PATENT DOCUMENTS

| | | | |
|---|---|---|---|
| 2,828,862 | 4/1958 | Johnson | 210/772 |
| 3,362,533 | 1/1968 | Muller | 210/772 |
| 3,538,179 | 11/1970 | Nelson | 208/259 X |
| 4,260,495 | 4/1981 | Bennoit et al. | 210/772 |
| 4,265,780 | 5/1981 | Kimura et al. | 134/40 X |
| 4,319,980 | 3/1982 | Jenkins | 208/8 LE |
| 4,501,670 | 2/1985 | Tyson et al. | 210/770 |
| 4,544,491 | 10/1985 | Tyson et al. | 210/772 |

Primary Examiner—Richard V. Fisher
Attorney, Agent, or Firm—Limbach, Limbach & Sutton

[57] ABSTRACT

A process for recovering succinimide lubricating oil additives from filter cakes formed during filtration of the additives employing a siliceous filter aid. The filter cakes are mixed with an aqueous solution of a base acting material having a pH above about 10, the mixture is held at a temperature above about 150° F. and settled to separate an upper succinimide containing phase which is recovered.

2 Claims, No Drawings

RECOVERY OF SUCCINIMIDES FROM FILTER CAKES

This application is a continuation-in-part of application 505,905 filed June 20, 1983 (now U.S. Pat. No. 4,501,670) which was a continuation-in-part of application 335,261 filed Dec. 23, 1981 and now abandoned.

TECHNICAL FIELD

This invention lies in the field of production of succinimide additives for lubricating oils.

BACKGROUND ART

The succinimides are detergent-dispersant additives for lubricating oils. They are prepared by reacting maleic anhydride with a polybutene with a molecular weight in the range about 700–1000. The polybutene double bond adds to the double bond of maleic anhydride in what is generally known as a "pseudo Diehls-Alder addition." This saturates the double bond of the maleic anhydride but leaves a double bond in the polybutene chain, close to the point of addition. This reaction produces a polybutene succinic anhydride. The succinimide is prepared by reaction of the polybutene succinic anhydride with an ethylene amine such as ethylene diamine, diethylene tramine, triethylene tetramine, etc., or with ethylene amine mixtures. There is a rather wide compositional spectrum of succinimides, polybutene molecular weight may be varied, the ethylene amine reactant may be varied, the mol ratio of polybutene succinic anhydride to ethylene amine may be varied and variations in tne mol ratio and reaction temperature produce imide-amide mixtures. While there are variations in precise compositions of succinimide additives, the processes by which they are produced have in common a final step of filtration of the succinimide reaction product using a filter aid, a siliceous material, usually diatomaceous earth.

The succinimide reaction product is a solution of the succinimide in oil (usually a lubricating oil) used as a reaction medium or added to the reaction product prior to filtration and suspended in the solution, particles of insoluble materials produced in the reaction. Filtration of the reaction product removes the insoluble material and results in the production of a filter cake having a substantial content of oil and succinimide. These filter cakes have been regarded as a waste material presenting a disposal problem. The present invention provides a process for treating these filter cakes to recover the contained oil and succinimide.

BRIEF DESCRIPTION OF THE INVENTION

Pursuant to the invention filter cakes produced by filtering a succinimide reaction product using a siliceous filter aid are mixed with an aqueous solution of a base-acting material, the solution having a pH at least about 10, the mixture is made and held at a temperature above 150° F., preferably from 180° F. to the boiling point of the mixture. During a holding period, usually 5 to 30 minutes, the mixture separates forming an upper oil phase, a relatively clear, aqueous intermediate phase and a lower phase which is a suspension of filter aid in the aqueous solution of base-acting material. The upper phase is recovered. The separation is improved by mixing the filter cake with 15 to 100 cc of a hydrocarbon diluent which may be toluene, xylenes or a petroleum distillate boiling in the range about 200°–350° F. Such petroleum distillates are commonly used as thinners or solvents. From about 25 to 100 cc of hydrocarbon to each 100 grams of filter cake are appropriate amounts to use.

Filter cakes obtained from commercial producers of succinimide additives differ in the rapidity with which phase separation occurs. In cases where the rate of phase separation is slow the rate may be increased by adding hot water or hot solution of the base-acting material employed to the mixture. Suitable amounts for such addition are 25 to 300 cc for each 100 grams of filter cake treated.

DETAILED DESCRIPTION

The following examples provide details of the application of the process to a number of filter cakes produced in commercial manufacture of succinimide additives.

EXAMPLE 1

A sample of filter cake formed during filtration of a polybutenyl succinimide using a siliceous filter aid was obtained from an additive manufacturer. This material was a free flowing, light brown mass, mainly a powder with small oil-saturated chunks distributed through it.

100-gram sample of the above filter cake was heated to 200° F. and 105 cc of 30% sodium carbonate solution at the same temperature was added in small increments with thorough maceration and agitation between each addition. During the addition and particularly in its latter stages, light colored filter aid could be seen separating from the mixture and a thick, dark brown oil was released. After the 105 cc had been added, the mixture was held at 200° F. for 10 minutes with gentle agitation and then slowly diluted with an additional 195 cc of the same hot 30% sodium carbonate solution. The mixture was allowed to stand for half an hour in an oven at 200° F. and separated into three phases—the lower phase consisted of about 160 cc of a light tan colored suspension of filter aid in the carbonate solution; the upper phase consisted of about 60 cc of a slightly turbid hydrocarbon solution of the succinimide in diluent oil (the alkenyl succinimide was diluted with a light mineral oil before filtration). The remainder of the mixture formed an intermediate phase of dark brown but relatively clear aqueous solution.

EXAMPLE 2

Example 1 was repeated but instead of using the slow addition and mixing technique, 105 cc of 20% sodium carbonate was rapidly added to the 100 grams of cake at 200° F. and macerated and stirred until a uniform blend formed and separation of oil and filter aid resulted. On dilution with an additional 195 cc of carbonate solution and treatment of this mixture as in Example 1, separation with almost identical results occurred.

EXAMPLE 3

The oily products obtained in both Examples 1 and 2 were viscous and separation can be facilitated in both cases by reducing the viscosity of the product with an inert hydrocarbon thinner, or light solvent such as toluene. This can be done after the separation has occurred by adding thinner to the oil phase until the desired viscosity is achieved (0.25–1 volume of thinner per volume of oil). Preferably, however, the original filter cake is dispersed in 0.25–1 volume with a thinner and then the separation conducted as above. The results are identical except that the apparent yield is increased by the volume of thinner added and the separation occurs more readily. Not only does the thinner reduce viscosity, but it also reduces the density and improves the separation at temperatures up to 200°-215° F. appreciably.

In the following examples the filter cake treated was a filter cake obtained by filtering a commercial succinimide additive product using a diatomaceous earth filter aid.

EXAMPLE 4

60 grams of filter cake were heated to 150° F. and mixed with 75 cc's of 5% sodium hydroxide. The sodium hydroxide solution was added slowly with continuous agitation during the addition period which extended for about five minutes. The mixture was gently agitated and held at temperature just below the boiling point for a period of about five minutes and then allowed to settle. An additional 50 cc of sodium hydroxide was then added and on standing the mixture separated into three phases, an upper oil phase, an intermediate clear aqueous phase and a lower phase consisting of a slurry of white solids in the sodium hydroxide solution. The solids were separated from the lower phase and examined. The solids were clean, white material which was substantially free of oil and succinimide.

This treatment was repeated with the only difference being the use of 2.5% sodium hydroxide in water as the treating agent. The solids separated from the bottom phase were somewhat darker in color than those obtained when the 5% sodium hydroxide solution was used and contained a small residual amount of of succinimide and oil.

EXAMPLE 5

Example 4 was repeated, first using 20% sodium carbonate in water as the treating agent and then using 10% sodium carbonate as the treating agent. With the 20% sodium carbonate a clean, white solid residue which was essentially completely free of succinimide and oil was produced and all of the oil and succinimide contained in the filter cake separated in an upper oil phase.

With 10% sodium carbonate the separation of succinimide and oil from the solids contained in the cake was reasonably effective but there remained a small amount of oil and succinimide trapped in the solids.

EXAMPLE 6

Example 4 was repeated, employing 20% sodium silicate as the treating agent. Separation of the succinimide and oil from the solid materials in the filter cake was essentially complete.

EXAMPLE 7

50 grams of filter cake were mixed with 50 cc's of a petroleum thinner boiling in the range 200° to 325° F. and the mixture was heated to 190° F. 75 cc's of 30% sodium carbonate solution in water were heated to boiling and then slowly added to the filter cake-thinner mixture with vigorous agitation over a period of about 5 minutes. When the sodium carbonate addition was complete, the total mixture was held at simmer temperature for about 5 minutes. An additional 50 cc of the carbonate solution was added and the mixture was then allowed to settle. Settling produced an upper oil phase, an intermediate aqueous phase, and a lower phase consisting of filter cake solids dispersed in the sodium carbonate solution. The dispersed solids had a slightly grayish color. The oil phase was recovered. The sodium carbonate initially had a pH of 11.6 and after settling the aqueous phase had a pH of 11.

EXAMPLE 8

Example 7 was repeated using a 30% borax solution as the treating agent. The pH of the borax solution initially was 9.8. Separation of the succinimide oil from the solids of the cake was adequate but less complete than with the sodium carbonate solution.

EXAMPLE 9

50 grams of filter cake were mixed with 50 cc's of petroleum thinner and heated to about 190° F. 75 cc's of a 2½% sodium carbonate solution having a pH 11.2 were added to the filter cake-thinner mixture. The addition was made while the carbonate solution was at its boiling point. The carbonate solution was added slowly with good agitation over a period of about 5 minutes and then held at simmering temperature for an additional period of 5 minutes. An additional 50 cc's of the sodium carbonate solution were added to the mixture and it was allowed to settle. Separation of the oil-succinimide from the filter cake was reasonably good but not as complete as when the higher concentrations of sodium carbonate are employed.

EXAMPLE 10

Example 9 was repeated with the only difference between Example 9 and this Example being the employment of an aqueous solution containing 2½ weight percent of sodium carbonate and 20 weight percent of sodium chloride. The pH of this solution was 10.3. The separation obtained was appreciably more complete than that obtained in Example 9. Why the presence of the sodium chloride together with the sodium carbonate gave an improved result is not understood but the result is understood and it is for some unexplainable reason clearly better.

EXAMPLE 11

Example 10 was repeated using as the treating agent 1% sodium hydroxide dissolved in a 20% potassium chloride solution. The separation obtained was essentially complete and markedly superior to the separation obtained when only 1% sodium hydroxide was used as the treating agent. The pH of the sodium hydroxide potassium chloride treating agent was 13.7.

The exemplified reagents employed to make the separation of the oil-succinimide from the filter cakes are base-acting materials in water solution at a concentration such that the solution has a pH greater than 10. Suitable base-acting materials are the alkali metal hydroxides, and alkali metal salts of weak acids, preferably salts of weak inorganic acids. Alkali metal salts of the number of organic acids meet the pH requirement but practical economics work against their use.

We claim:

1. A process for recovering succinimide lubricating oil additives from a filter cake formed during filtration of a succinimide additive or succinimide additive in oil solution employing a siliceous filter aid in the filtration, which comprises:

mixing said filter cake with from about 15 cc to 100 cc of a hydrocarbon diluent boiling in the range of about 200° to 350° F. per 100 grams of filter cake;

then adding to the resultant mixture a hot aqueous solution of a base-acting material having a pH above about 10 to form a slurry at a temperature above about 150° F.; holding the slurry at a temperature above about 150° F. and settling the slurry to separate an upper succinimide phase and recovering the upper phase.

2. The process defined in claim 1 wherein from about 25 to 300 cc of hot water or hot aqueous solution per 100 grams of contained filter cake are added to the mixture of filter cake and solution of base-acting material prior to settling to separate an upper succinimide phase.

* * * * *